United States Patent
Mindl et al.

(10) Patent No.: US 6,838,976 B2
(45) Date of Patent: Jan. 4, 2005

(54) KEYLESS ACCESS CONTROL DEVICE AND METHOD FOR MOTOR VEHICLES

(75) Inventors: Anton Mindl, Ludenscheid (DE); Detlef Kerkmann, Nachrodt (DE)

(73) Assignee: Leopold Kostal GmbH & Co. KG, Ludenscheid (DE)

(*) Notice: Subject to any disclaimer, the term of this patent is extended or adjusted under 35 U.S.C. 154(b) by 669 days.

(21) Appl. No.: 09/897,373

(22) Filed: Jul. 2, 2001

(65) Prior Publication Data

US 2002/0011920 A1 Jan. 31, 2002

Related U.S. Application Data

(63) Continuation of application No. PCT/EP00/00157, filed on Jan. 12, 2000.

(30) Foreign Application Priority Data

Jan. 25, 1999 (DE) .......................................... 199 02 792

(51) Int. Cl.$^7$ ............................................. G05B 23/00
(52) U.S. Cl. .......................... 340/5.72; 340/5.6; 70/278; 235/28.25
(58) Field of Search ............................. 340/5.61, 5.72, 340/5.7, 5.6; 235/282.5, 382; 70/278

(56) References Cited

U.S. PATENT DOCUMENTS 6,072,403 A * 6/2000 Iwasaki et al. ............ 340/5.72

FOREIGN PATENT DOCUMENTS

| DE | 33 13 100 A1 | 8/1984 |
| DE | 43 42 467 A1 | 6/1995 |
| DE | 43 29 697 C2 | 10/1995 |
| DE | 197 28 761 C1 | 9/1998 |
| EP | 0 218 251 A1 | 10/1986 |
| FR | 2 749 873 A1 | 6/1996 |

* cited by examiner

Primary Examiner—Michael Horabik
Assistant Examiner—M Shimizu
(74) Attorney, Agent, or Firm—Brooks Kushman P.C.

(57) ABSTRACT

A keyless access control device and method for a vehicle having a door and a door handle includes transmitting a code from a transceiver while a cover covers the door handle to prevent a user from actuating the door handle. A transponder of the user transmits an answer to the transceiver upon receipt of the code. The answer is checked to conduct a preliminary verification of whether the user is authorized to access the vehicle. The cover uncovers the door handle if the preliminary verification indicates that the user is authorized to access the vehicle. A bidirectional question and answer dialog takes place between the transceiver and the transponder to conduct a final verification of whether the user is authorized to access the vehicle upon the user actuating the door handle. The door is unlocked if the final verification is indicative of the user having access to the vehicle.

5 Claims, 2 Drawing Sheets a)       b)

KEYLESS ACCESS CONTROL DEVICE AND METHOD FOR MOTOR VEHICLES

CROSS-REFERENCE TO RELATED APPLICATIONS

This is a continuation of International Application PCT/EP00/00 157, published in German, with an international filing date of Jan. 12, 2000, which claims priority to DE 199 02 792.7, filed on Jan. 25, 1999.

TECHNICAL FIELD

The invention pertains to a keyless access control device, in particular, a keyless access control device for motor vehicles that contains a transceiver device assigned to the motor vehicle and a mobile transponder, where the transceiver device and the transponder exchange code signals in order to carry out a bidirectional question-and-answer dialogue for checking the access authorization, and where a control device is provided that cooperates with at least one electric switch that is influenced by at least one operating element assigned to the motor vehicle.

BACKGROUND ART

A method and device of this type are known from the article "Ein Fahrzeugsicherungssystem ohne mechanischen Schlüssel" [A Motor Vehicle Security System without Mechanical Key] by Ch. Schneider and U. Schrey which was published in "Automobiltechnische Zeitschrift 96" (1994), No. 5, as well as from the article "Smart-Card—Abschied vom Autoschlüissel" [Smart-Card-Farewell to the Car Key] by U. Schrey, Ch. Schneider and M. Siedentrop which was published in "Siemens Zeitschrift 1/96." The access control device described in these articles essentially consists of a transceiver device that is assigned to the motor vehicle and a mobile transponder. The transceiver device comprises three transmitters (LF-transmitters) that operate in the inductive frequency range, where one transmitter is assigned to the driver-side door, another is assigned to the passenger-side door and a third is assigned to the trunk of the motor vehicle. The transmitting antennas of the LF-transmitters are integrated into the respective car doors and into the rear bumper. Each LF-transmitter is connected to the door handle assigned to the respective door and to the trunk release button in such a way that when the door handle or the trunk release button is actuated, the LF-transmitter assigned to this region of the motor vehicle transmits a low-frequency code signal (LF-signal). The remaining LF-transmitters remain inactive and do not transmit LF-signals.

The transceiver device assigned to the motor vehicle is also equipped with an HF-receiver for receiving an HF-signal from the transponder. The answer signal of the transponder that is received in the HF-receiver acts on a control unit that is equipped with a processor. The answer signal that was received in the form of an encrypted code is decoded and checked with respect to its validity in this control unit. If the result of this validity check is positive, a corresponding control signal is delivered to the respective door locking mechanism in order to unlock the door, the door handle of which was previously actuated.

The transponder consists of a so-called access card with an LF-receiver and a low-power HF-transmitter. The inductive reception antenna is realized in the form of a frame antenna, and the high-frequency transmission antenna is realized in the form of a printed-circuit board antenna. The LF-signal received by the LF-receiver of the transponder is decoded in the transponder. A microprocessor assigned to the transponder then processes the code word contained in the LF-signal with a security algorithm and transmits the result to the HF-receiver of the transceiver device assigned to the motor vehicle by means of the HF-transmitter.

The transmission of LF-signals for "awakening" the transponder results in a limitation of the functional radius due to the rapidly decreasing magnetic field. Reception of the transmitted LF-signal is only possible within a functional radius of 1.5–2 m. This is intended to ensure that only those transponders actually located within such a close vicinity are awakened by the LF-transmitter. A definitive localization of the transponder or the person carrying the transponder is effected due to the required actuation of a door handle or a trunk release button and the limited functional radius.

Modified door handle and lock mechanisms that make immediate access to the automobile possible via the door, the handle of which was previously actuated, are used for unlocking the respective motor vehicle door as rapidly as possible. However, even these mechanisms do not make it possible to shorten the time required for transmitting the data from the LF-transmitter to the transponder. This applies, in particular, if complex encrypted codes must be transmitted on this low-frequency link because this process requires a certain time due to the low data transmission speed. However, the transmission of the decoded answer signal from the transponder to the HF-receiver only delays the beginning of the door unlocking process insignificantly.

Another keyless access control device for motor vehicles is known from DE 43 29 697 C2. This device uses a central LF-transmitter for transmitting the low-frequency code signal. However, the LF-transmitter of this device transmits LF-signals cyclically within certain intervals. The transponder is only awakened and transmits its answer signal when the transponder assigned to the motor vehicle is located within the functional radius of the LF-transmitter. In this device, actuation of a door handle or a trunk release button is not required to trigger the unlocking mechanism. Since with this device localization of the transponder in order to unlock only certain doors is not possible, this access control device is only suitable for motor vehicles with a centrally controlled locking system. In this known access control device, a delayed unlocking also occasionally occurs due to the transmission time of the LF-signal that may have a complex design under certain circumstances.

DE 197 28 761 C1 also describes a keyless access control device that uses several LF-transmitters. These LF-transmitters are arranged within certain regions of the motor vehicle and each transmits a signal that differs from those from the other LF-transmitters. The mobile transponder that contains an LF-receiver and an HF-transceiver device is awakened by the LF-transmitter and subsequently begins a question-and-answer dialogue with the transceiver device assigned to the motor vehicle in order to check access authorization. If the result of this question-and-answer dialogue is positive, the corresponding motor vehicle door is unlocked.

The advantage of this keyless access control device is that it is not necessary to actuate a door handle in order to initiate communication between the motor vehicle and the transponder, i.e., no noticeable delay occurs between the actuation of the door handle and the unlocking of the door. However, this device also has the disadvantage that the door(s) may be unintentionally unlocked if an authorized user is in the vicinity of the motor vehicle.

SUMMARY OF THE INVENTION

Based on the initially discussed state of the art, the invention aims to propose a keyless access control device for motor vehicles, as well as a method for implementing a keyless access authorization control for motor vehicles, which is not only suitable for unlocking individual doors or hatches, but also effectively prevents the unintentional unlocking of the motor vehicle doors, where this keyless access control device also allows the exchange of complex code signals and answer signals without a noticeable delay in the unlocking process.

This objective is attained due to the fact that at least one of the operating elements is protected from being actuated by a movable, mechanical cover until a first code message that contains a gross identification of the authorized user is received.

A first code signal transmitted by the motor vehicle merely serves for the so-called "awakening" of the transponder when an authorized user approaches the motor vehicle. The first coded answer signal which is subsequently transmitted from the transceiver device of the transponder serves for a preliminary verification of the access authorization which is subject to only a relatively low standard of security and for opening the covers that were previously concealing the operating elements.

Only the actuation of one of these operating elements initiates the question-and-answer dialogue between the transceiver device assigned to the motor vehicle and the transponder which is carried out with a high standard of security.

System security is significantly increased due to the fact that this question-and-answer dialogue only takes place once the user, who was identified as a presumably authorized user during the initial gross verification, expresses his desire to open the motor vehicle by actuating the door handle. The actions of the user simultaneously identify the door to be opened if another type of unlocking is not desired (e.g., in accordance with a centrally controlled locking system).

It is advantageous that the operating elements are formed by the door handles of the motor vehicle.

It is also advantageous that electromotive driving means are used for opening and closing the mechanical cover of at least one of the operating elements.

BRIEF DESCRIPTION OF THE DRAWINGS

Additional advantages of the invention are disclosed below with reference to a preferred embodiment. The drawings show.

DETAILED DESCRIPTION OF THE PREFERRED EMBODIMENT(S)

Figure 1:
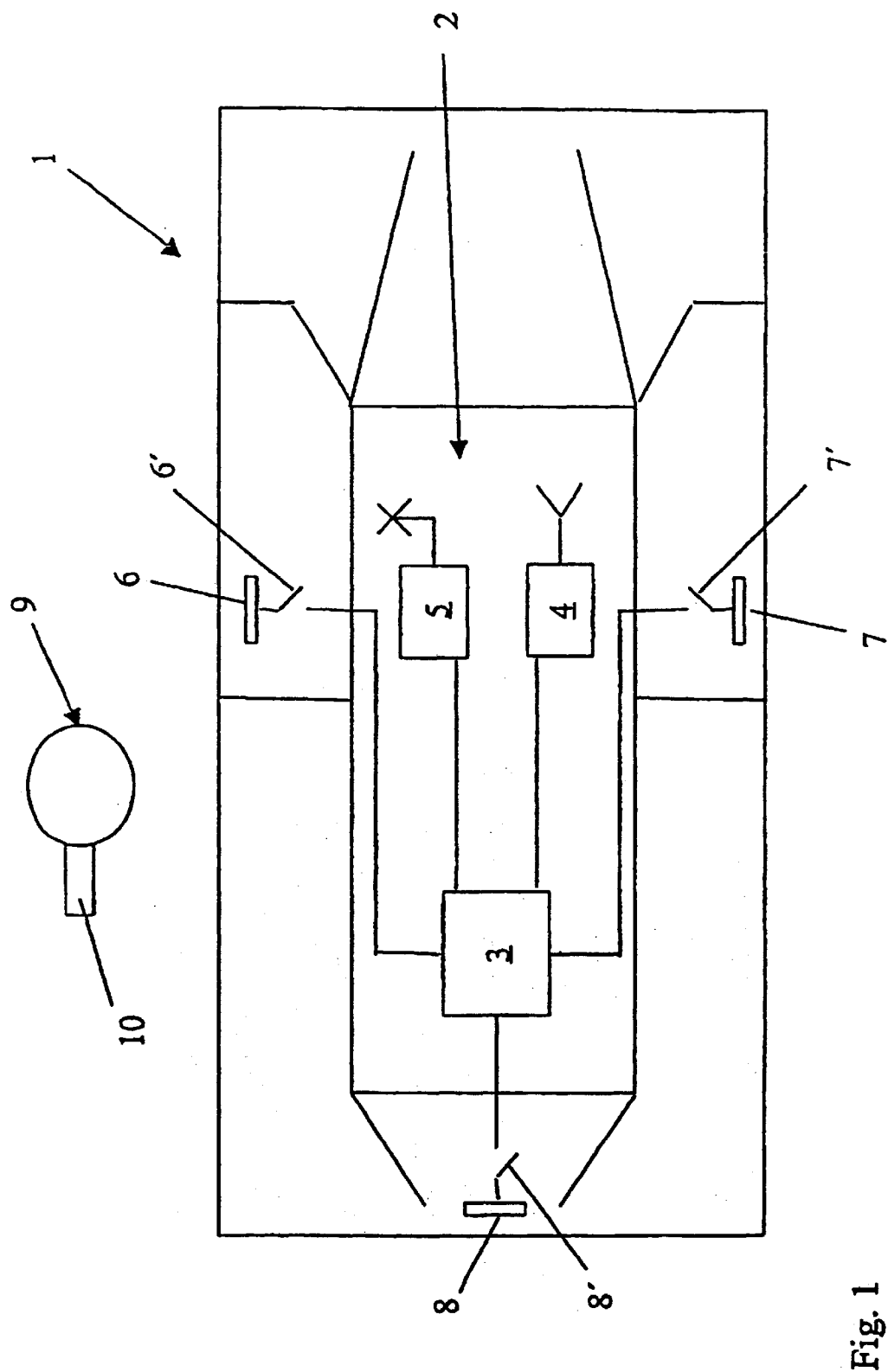
FIG. 1, a schematic representation of a keyless access control device for motor vehicles, and FIGS. 2A and 2B, one option for realizing the mechanical cover of a door handle.

FIG. 1 schematically shows a motor vehicle 1 equipped with a keyless access control device. The access control device consists of a control unit 3 arranged in the motor vehicle 1, with a transceiver device 2, as well as electric switches 6', 7', 8' that cooperate with the door handles 6, 7, 8 via corresponding lines, connected to said control unit. The transceiver device 2 contains at least one transmitter 4 and one receiver 5 for carrying out a question-and-answer dialogue with a mobile transponder 9. The transponder 9 also contains a transmitter and a receiver, as well as a microprocessor for carrying out the processes associated with the question-and-answer dialogue. The power supply of the transponder 9 (not shown in greater detail) comprises a rechargeable battery, e.g., a lithium-ion battery.

A keyless access authorization control with the access control device shown in FIG. 1 is carried out as described below:

The transmitter 4 transmits a coded signal that is received by the transponder 9 as it approaches the motor vehicle 1, e.g., while being carried in the pocket of the authorized person, and serves to "awaken" the transponder 9. The transponder 9 recognizes the coded signal and transmits a coded answer signal.

The transceiver device 2 which is arranged in the motor vehicle 1 is started simultaneously with the cyclical transmission of the coded signal. The coded answer signal transmitted by the transponder 9 is received by the transceiver device 2 in the motor vehicle 1. The received code is checked, and if the results of the check are positive, the electric switches 6', 7', 8', as well as the door handles 6, 7, 8 which cooperate with these electric switches, are released by the control unit 3. This release is effected by making the door handles 6, 7, 8 accessible to the user, namely by retracting the covers that previously covered the door handles.

Figure 2:
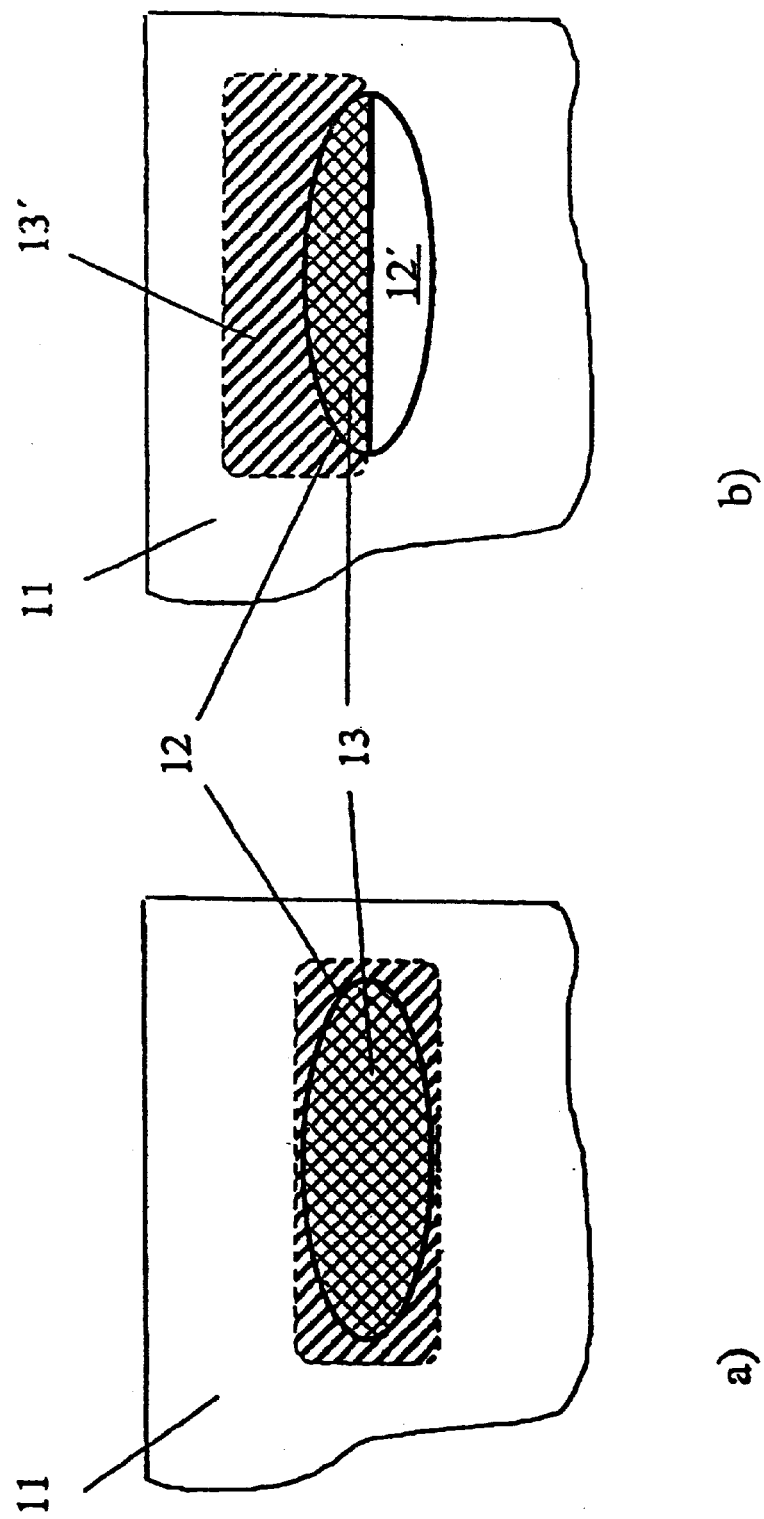

FIGS. 2A and 2B show a possible embodiment of these covers: the outside of the door 11 contains a handle depression 12 that is initially entirely covered by the handle element 13 as shown in FIG. 2A, so that the handle element cannot be moved by hand. Once the door handle is released, an electric motor moves the handle element 13 upward, resulting in the situation shown in FIG. 2B. Here, the part 13' of the handle element 13 which previously covered the handle depression 12 partially disappears behind the door 11 and the user is able to actuate the handle element by hand within the region 12' of the handle depression. In this position, the handle element 13 can also be raised by hand such that the electric switch assigned to this handle element is actuated.

The actuation of the switch causes the bidirectional question-and-answer dialogue between the transponder device 2 in the motor vehicle and the transponder 9 to be initiated. The access authorization is checked during this dialogue. The answer signal of the transponder 9 which is received by the transceiver device 2 is decoded and compared to a nominal value or several nominal values, whereafter the access authorization of the person carrying the transponder is determined. Once a valid answer code signal is received, the control unit 3 delivers a release signal to the motor vehicle door, the handle element of which was actuated, in order to unlock this door.

A transponder receptacle, into which the transponder 9 with its ferrite core antenna 10 can be inserted, is arranged at a suitable location in the motor vehicle 1. An inductive charging device is assigned to this transponder receptacle so that the rechargeable battery of the transponder 9 is recharged when the motor vehicle 1 is in use. An additional device for carrying out question-and-answer dialogues is also assigned to the transponder receptacle. These question-and-answer dialogues are carried out analogously to the previously described question-and-answer dialogue, but with the objective of switching off a transmission lock and/or inquiring or starting other security or operating conditions.

What is claimed is:

1. A keyless access control device for a vehicle having a door and a door handle, the device comprising:

a cover associated with the door handle, wherein the cover is movable between a first state in which the cover covers the door handle to prevent actuation of the door handle by a vehicle user and a second state in which the cover uncovers the door handle to allow actuation of the door handle by the vehicle user, wherein the cover is in the first state and covers the door handle while the door is locked to prevent actuation of the door handle by the vehicle user prior to a preliminary verification indicating that the vehicle user is authorized to access the vehicle;

a controller operable for moving the cover between the first and second states;

a transceiver operable for transmitting a code signal and for receiving an answer signal; and a transponder associated with the vehicle user, the transponder operable for receiving the code signal from the transceiver and for transmitting an answer signal to the transceiver in response to receiving the code signal;

wherein the transceiver checks the answer signal received from the transponder to conduct the preliminary verification of whether the vehicle user is authorized to access the vehicle;

wherein the controller moves the cover from the first state to the second state to uncover the door handle to allow actuation of the door handle by the vehicle user while the door is locked if the preliminary verification is indicative of the vehicle user being authorized to access the vehicle;

wherein upon actuation of the door handle by the vehicle user the transceiver and transponder conduct a bidirectional question and answer dialog to conduct a final verification of whether the vehicle user is authorized to access the vehicle, wherein the controller unlocks the door if the final verification is indicative of the vehicle user being authorized to access the vehicle.

2. The device of claim 1 wherein:

the cover is formed by a handle element of the door handle, wherein in the first state of the cover the handle element is prevented from being actuated by the vehicle user and in the second state of the cover the handle element is enabled to be actuated by the vehicle user.

3. The device of claim 1 wherein:

the controller includes electromotive driving means operable for moving the cover between the first and second states.

4. A keyless access control device for a vehicle having a door and a door handle, the device comprising:

a cover movable between a first state in which the cover covers the door handle to prevent actuation of the door handle by the vehicle user and a second state in which the cover uncovers the door handle to allow actuation of the door handle by the vehicle user, wherein the cover is in the first state and covers the door handle while the door is locked to prevent actuation of the door handle by the vehicle user;

a controller operable for moving the cover between the first and second states and for locking and unlocking the door;

a transceiver operable for transmitting a code signal and for receiving an answer signal; and a transponder associated with the vehicle user, the transponder operable for receiving the code signal from the transceiver and for transmitting an answer signal to the transceiver in response to receiving the code signal;

wherein the transceiver checks the answer signal received from the transponder to conduct a preliminary verification of whether the vehicle user is authorized to access the vehicle;

wherein the controller moves the cover from the first state to the second state while the door is locked to uncover the door handle to allow actuation of the door handle by the vehicle user if the preliminary verification is indicative of the vehicle user being authorized to access the vehicle;

wherein upon actuation of the door handle by the vehicle user the transceiver and transponder conduct a bidirectional question and answer dialog to conduct a final verification of whether the vehicle user is authorized to access the vehicle, wherein the controller unlocks the door if the final verification is indicative of the vehicle user being authorized to access the vehicle.

5. A keyless access control method for a vehicle having a door and a door handle, the method comprising:

transmitting a code signal from a transceiver associated with the vehicle while a cover covers the door handle to prevent actuation of the door handle by a vehicle user and while the door is locked;

transmitting an answer signal from a transponder associated with the vehicle user to the transceiver upon receipt of the code signal by the transponder;

checking the answer signal received from the transponder by the transceiver in order to conduct a preliminary verification of whether the vehicle user is authorized to access the vehicle;

moving the cover to uncover the door handle while the door is locked in order to allow actuation of the door handle by the vehicle user if the preliminary verification is indicative of the vehicle user being authorized to access the vehicle;

conducting a bidirectional question and answer dialog between the transceiver and the transponder to conduct a final verification of whether the vehicle user is authorized to access the vehicle upon actuation of the door handle by the vehicle user; and unlocking the door if the final verification is indicative of the vehicle user being authorized to access the vehicle.

* * * * *